INVENTOR.
DAVID T. AYERS, JR.
BY John F. Phillips
ATTORNEY

July 4, 1961

D. T. AYERS, JR 2,990,815

BOOSTER MOTOR MECHANISM

Filed Aug. 11, 1958

INVENTOR.
DAVID T. AYERS, JR.
BY
ATTORNEY

United States Patent Office 2,990,815
Patented July 4, 1961

2,990,815
BOOSTER MOTOR MECHANISM
David T. Ayers, Jr., Birmingham, Mich., assignor to Kelsey-Hayes Company, Detroit, Mich., a corporation of Delaware
Filed Aug. 11, 1958, Ser. No. 754,325
10 Claims. (Cl. 121—41)

This invention relates to a booster motor mechanism.

Several types of brake booster mechanisms have been developed employing lever means which come into operation upon the building up of pressure in the master cylinder for transmitting reaction of the brake pedal to provide the latter with "feel." These devices have been generally successful and highly efficient in operation, but they usually are of such nature as to make the cost of manufacturing and assembling the devices rather prohibitive.

An important object of the present construction is to provide a booster motor mechanism employing lever means for reacting against the brake pedal in the manner referred to and wherein the mechanism is highly simplified from the standpoints of manufacture and assembly, thus materially reducing the cost of the mechanism.

A further object is to provide a mechanism of the character referred to having a novel means for mounting the reaction levers relative to the pressure responsive unit of the motor, thus facilitating both the maunfacture and assembly of the mechanism.

A further object is to provide a mechanism of this character wherein the reaction levers are provided with pivot trunnions and wherein the body of the pressure responsive unit is radially slotted and provided with trunnion-receiving grooves to facilitate the assembling of the mechanism.

A further object is to provide a novel combination of spring devices associated with the reaction ring through which reaction forces are transmitted from the levers to the pedal, and wherein such spring devices are arranged between the inner reaction member and the pressure responsive and pedal operable units respectively, the arrangement of parts being such that the spring devices combine to oppose movement of the reaction ring so that direct reaction forces will not be transmitted to the pedal until the vehicle brake shoes reach the point of approximate engagement with the brake drums.

A further object is to provide a mechanism of the character referred to, wherein the pressure responsive unit of the motor comprises in part a simple stamping adapted to perform a plurality of functions including the provision of means for transmitting motor piston forces to the levers, a spring seat for engaging one end of the return spring for the pressure responsive unit of the motor, and the provision of an annular flange over which rolls a diaphragm forming a part of the pressure responsive unit.

A further object is to provide a motor structure wherein the pressure responsive unit further comprises a simple stamping formed as an element separate from the stamping referred to above and which also serves a plurality of purposes including clamping to the pressure responsive unit the radially inner edge of a diaphragm element; providing a seat for the reaction spring device associated with the inner reaction ring, and providing at its inner edge an air valve seat engageable by the control valve for the motor.

Other objects and advantages of the invention will become apparent during the course of the following description.

In the drawings I have shown one embodiment of the invention. In this showing:

Figure 2:
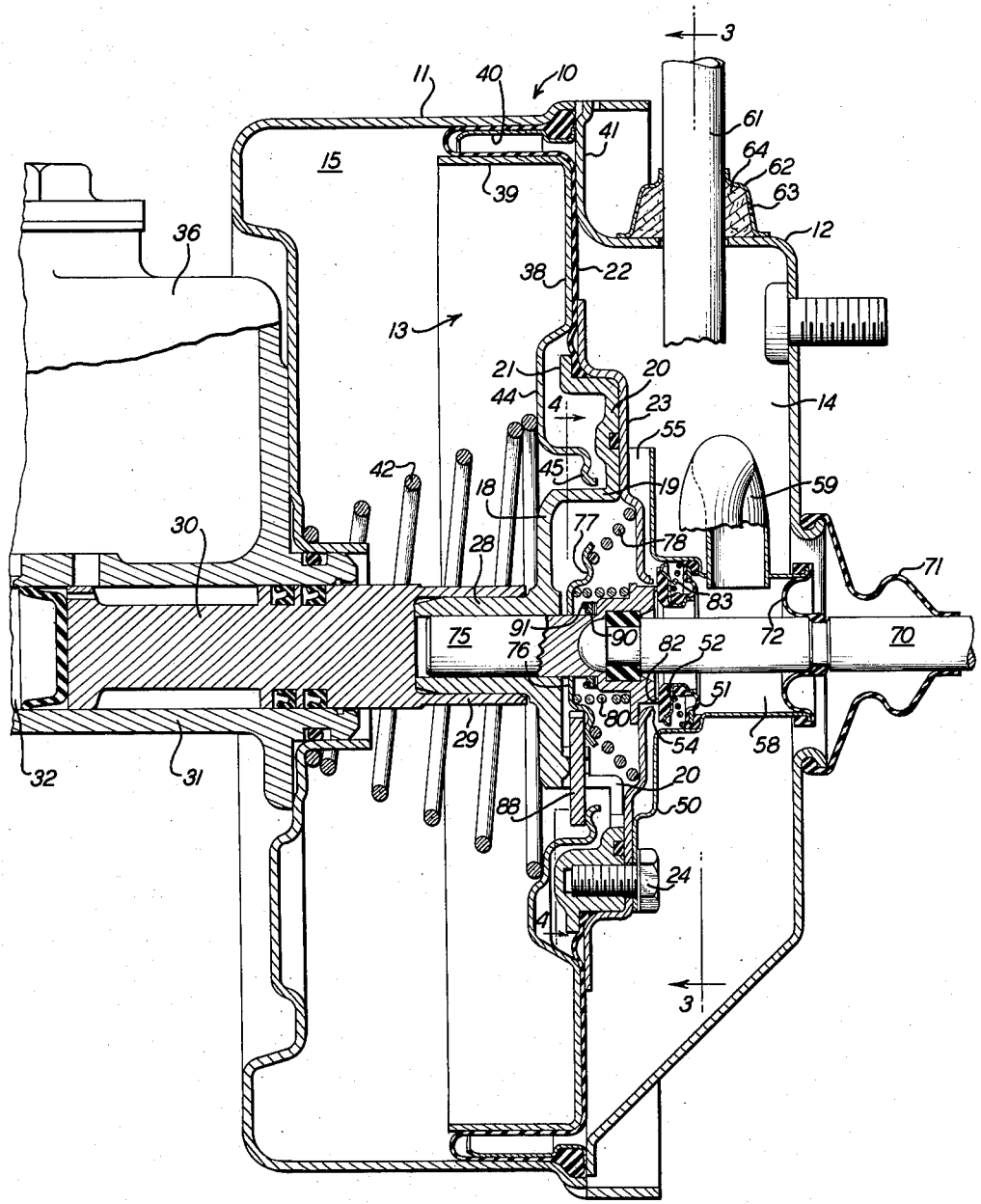
FIGURE 2 is an enlarged fragmentary sectional view taken axially through the motor unit and associated elements, the section being taken substantially on line 2—2 of FIGURE 3.

Referring to FIGURE 2, the numeral 10 designates a motor unit as a whole comprising casing sections 11 and 12 suitably connected together at their peripheries to form a motor housing. A pressure responsive unit indicated as a whole by the numeral 13 is arranged in the motor housing and divides the latter to form a pair of chambers 14 and 15 (FIGURE 2). The chamber 14 is in constant communication with the atmosphere, as described below. The chamber 15 is the variable pressure chamber of the motor, normally connected to the chamber 14 and adapted to be disconnected from such chamber and connected to a source of vacuum by a valve mechanism to be described.

The pressure responsive unit 13 comprises a preferably die-cast body 18 having a cylindrical wall 19 slotted radially at circumferentially spaced points, as at 20, for a purpose to be described. The body 18 also includes a radially outwardly projecting wall 20, the outer portion of which extends to the left and then radially outwardly to form a flange 21. Against this flange is seated the radially inner extremity of a rolling diaphragm 22 clamped in position by a stamped plate 23 forming a part of the pressure responsive unit and secured to the body 18 as at 24.

The body 18 is provided with a cylindrical axial projection 28 fitting into a cylindrical extension 29 formed on a plunger 30, the body of which is formed as a conventional master cylinder plunger operable in a master cylinder 31 to generate pressure in a chamber 32. This chamber is connected by fluid lines 33 (FIGURE 1) to the vehicle wheel cylinders 34 to apply the brakes of the vehicle. The master cylinder is supplied with fluid from a conventional reservoir 36 secured against the end wall of the motor housing 11 in any suitable manner.

The pressure responsive unit 13 further comprises a stamping 38, the outer portion of which is formed as a cylindrical flange 39 over which rolls the adjacent portion of the diaphragm 22. The outer bead of the diaphragm is fixed with respect to the motor housing as shown in FIGURE 2, being held in position by a retaining ring 40. It will be noted that the housing 12 is provided with a radial wall portion 41 against which seats the adjacent portion of the diaphragm 22 to limit movement of the pressure responsive unit to the off position shown in FIGURE 1.

The stamping 38 is provided with an offset portion 44 forming a seat for one end of a return spring 42 which urges the pressure responsive unit to off position, the other end of this spring bearing against the end wall of the motor housing 11, as shown. Inwardly of the adjacent end of the spring 42, the stamping 38 terminates radially outwardly of the cylindrical wall 19 in a reaction ring 45 for a purpose to be described. It will be noted that the single stamping 38 provides the reaction ring 45, forms a seat for the spring 42 and utilizes its cylindrical flange 39 for a surface over which the diaphragm 42 rolls as the pressure responsive unit 13 moves axially of the motor.

A relatively light stamping 50 is secured against the stamping 23 by the screws 24. Within this stamping is mounted a diaphragm 51 fixed at its radially outer extremity to the stamping 50 and carrying a resilient valve element 52. This valve element is normally disengaged from, but movable into engagement in a manner to be described with, a valve seat 54 formed at the radially inner edge of the stamping 23. The space radially outwardly of the valve seat 54 communicates with the air chamber 14 at all times through passages 55 formed in hollow ribs 56 stamped from the member 50. When the valve 52 is disengaged from the seat 54, therefore, the space within the cylindrical flange 19 is open to the atmosphere and, since such space is also open through the slots 20 to the motor chamber 15, atmospheric pressure is normally present in such chamber.

Figures 3, 4:
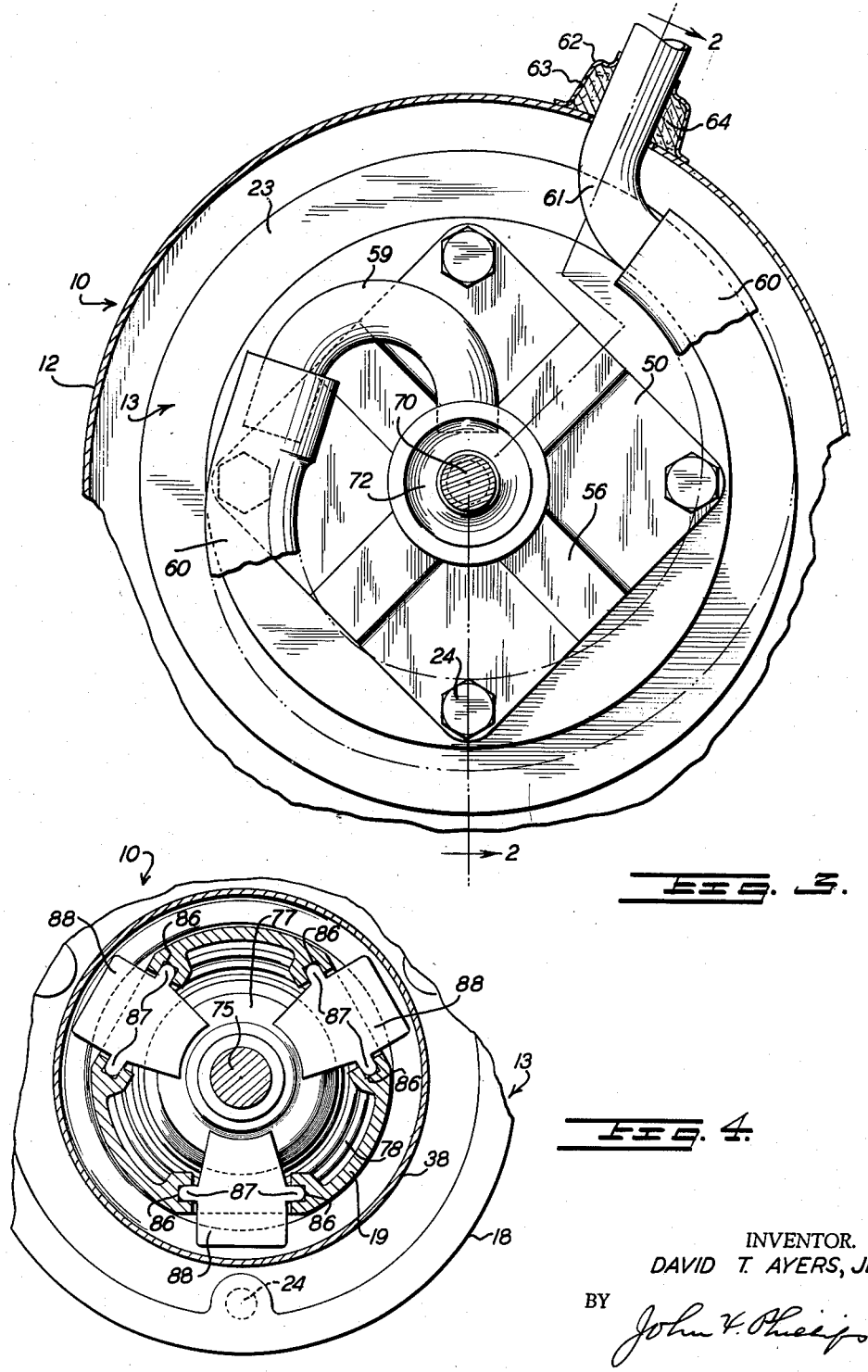
FIGURE 3 is a fragmentary sectional view taken substantially on line 3—3 of FIGURE 2.
FIGURE 4 is a similar view on line 4—4 of FIGURE 2.

To the right of the diaphragm 51 as viewed in FIGURE 2, the stamping 50 is provided with a vacuum chamber 58 communicating through an elbow 59 with a pigtail hose 60 (FIGURE 3), the opposite end of this hose communicating with an elbow 61 extending through the wall of the motor housing 12 for connection with a fluid line leading to a source of vacuum such as the intake manifold of the vehicle engine. The portion of the elbow 61 outwardly of the motor housing 12 is surrounded by a housing 62 communicating with the atmosphere through openings 63 and provided therein with an air cleaning unit 64. Air is supplied to the chamber 14 around the elbow 61, as well be apparent.

Figure 1:
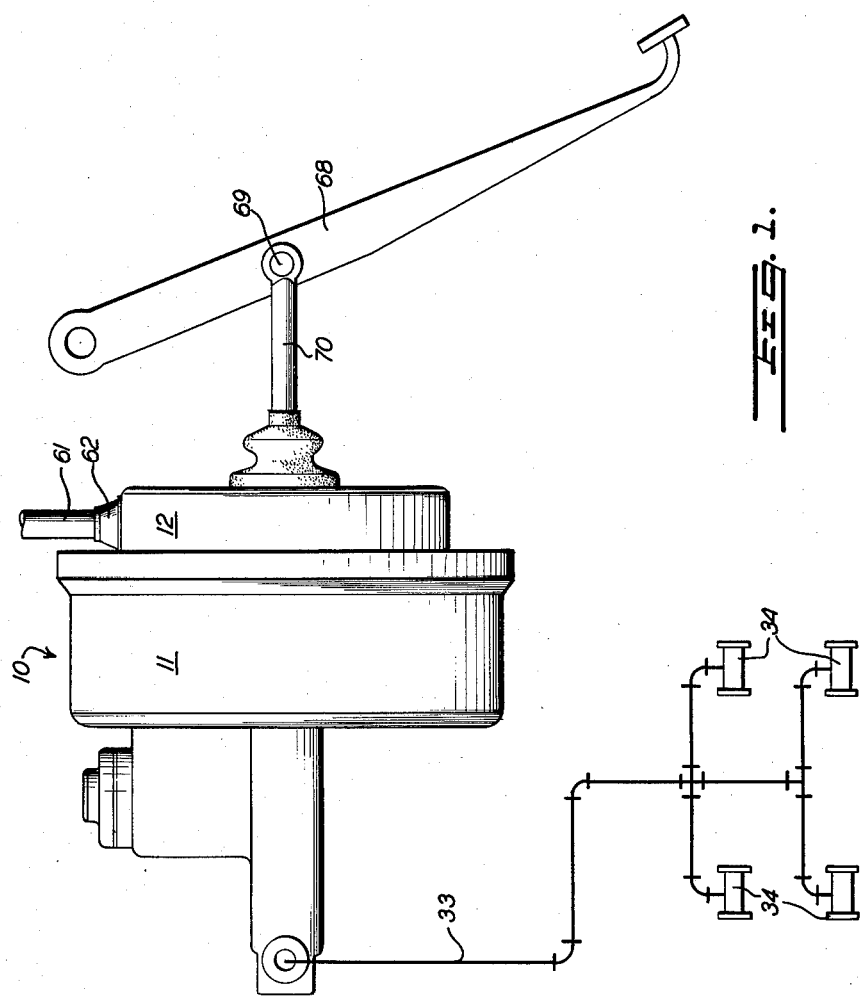
FIGURE 1 is a side elevation of the booster unit, the connections of the master cylinder to the wheel cylinders being diagrammatically illustrated.

Referring to FIGURE 1, the numeral 68 designates a brake pedal of the depending type pivotally connected as at 69 to a push rod 70 projecting axially into the motor as shown in FIGURE 2. A boot 71 surrounds the push rod 70 and is connected to the motor housing 12. A boot 72 is connected between the push rod 70 and the adjacent end of the member 50 to close the chamber 58 to the atmosphere.

An axially movable stem 75 is arranged in alinement with and connected to the push rod 70, as shown in FIGURE 2. The stem 75 is surrounded by a reaction plate 76 having an annular reaction rib 77 for a purpose to be described. Radially outwardly of the rib 77, the plate 76 is engaged by one end of a conical reaction spring 78, the other end of which engages the stamping 23 to urge the reaction plate 76 toward the left as viewed in FIGURE 2. A control spring 80 engages at one end against a portion of the stem 75 and at its other end against the plate 76. The spring 80 exerts a force to the left against the plate 76 and to the right against the stem 75 and push rod 70 to bias these elements to the normal position shown in FIGURE 2. The stem 75 is provided at its right-hand end in FIGURE 2 with a valve seat 82 normally engaging the valve 52 and holding the latter in spaced relation to the seat 54. The valve 52 is urged to the left in FIGURE 2 by a biasing spring 83, and it will be apparent that the spring 80 is stronger than the spring 83 so that when the parts are released, the spring 80 will hold the valve 52 away from the seat 54. The normal engagement of the valve 52 with the seat 82 closes the vacuum chamber 58 to the motor chamber 15.

The die-cast body 18 is preferably provided with three of the slots 20 previously referred to. At opposite sides of each of these slots are formed recesses 86 (FIGURE 4) to pivotally support trunnions 87 carried by radial lever elements 88 intermediate the radially inner and outer limits thereof. The radially inner ends of the levers 88 engage the reaction rib 77 of the plate 76, while the radially outer ends of the levers engage the annular ribs 45 of the stamping 38. Obviously, the levers 88 are adapted to rock on their trunnions 87 for a purpose to be described. The stem 75 carries a washer 90 to which is bonded a small rubber bumper 91 normally spaced from the plate 76 and engageable therewith under conditions to be described.

*Operation*

The parts are shown in their normal positions in FIGURE 2, the valve 52 engaging the seat 82 and being spaced from the seat 54. The atmospheric motor chamber 14, accordingly, communicates with the chamber 15 around the valve seat 54 and through slots 20. Accordingly, the motor is air-suspended.

The motor is operated by depressing the pedal 68 (FIGURE 1) to move the rod 70 to the left, thus imparting movement in the same direction to the stem 75 (FIGURE 2). This action takes place solely against the spring 80, the left-hand end of which will be stationary since the plate 76 will have its rib 77 engaging the inner ends of the levers 88, and these levers are prevented from swinging because of the engagement of the outer ends thereof with the rib 45.

Movement of the rod 70 in the manner referred to moves the valve seat 82 to the left and the valve 52 remains in engagement with such seat due to the biasing action of the spring 83. This movement continues until the valve 52 engages the seat 82, at which point the valve elements will be in lap position. Further movement of the rod 70 will move the valve seat 82 away from the valve 52. Under such conditions, the space within the cylindrical flange 19 will be disconnected from the atmosphere and opened to the vacuum chamber 58 and air will be exhausted from the motor chamber 15.

The pressure responsive unit 13 will then move to the left due to differential pressures in the motor chambers 14 and 15 and the plunger 30 will be moved to displace fluid from the master cylinder chamber 32 through lines 33 to the wheel cylinders 34. Force is delivered to the plunger 30 from the body 18, and it will be noted that the plate 38 and diaphragm 22 are movable to the left of the plate 23 out of engagement therewith when the plunger 30 encounters resistance due to the building-up of pressure in the chamber 32. In other words, when such resistance exceeds the loading of the spring 42, the plate 38 will move relatively to the left in FIGURE 2, thus transmitting force to the radially outer ends of the levers 88 through the rib 45 to rock the levers. Such rocking movement is opposed by the combined forces of the springs 78 and 80 until the plate 76 engages the bumper 91. The period between initial rocking of the levers 88 and engagement of the plate 76 with the bumper 91 constitutes the first stage of reaction against movement of the brake pedal, and such reaction is transmitted resiliently. By using the combined forces of the springs 78 and 80 to oppose movement of the plate 76 in the initial reaction stage, the beginning of the second stage of reaction, when the plate 76 engages the bumper 91, is effectively delayed until the pressure in the chamber 32 and in the brake lines is sufficiently high to approximately engage the brake shoes with the drums. Beyond this point, the direct engagement of the plate 76 with the bumper 91 transmits direct reaction forces through the rod 70 to the brake pedal 68, and such reaction forces will always be proportional to the pressure in the master cylinder chamber 32.

The valve mechanism obviously provides a follow-up action of the pressure responsive unit 13 relative to movement of the rod 70. Whenever the valve seat 82 is open and movement of the pedal is arrested, the pressure responsive unit will move slightly to restore the lap position of the valves, thus stopping further operation of the motor.

When the pedal is released, the spring 80 will immediately move the valve seat 82 into engagement with the valve 52 and lift the latter from the seat 54 to again air-suspend the unit.

The structural characteristics of the mechanism are such as to facilitate manufacture and assembly of the device, as well as providing a highly efficient device in operation. For example, the body 18 is die-cast in the shape shown with the slots 20 therein, and the levers 88 are assembled by inserting them from within the cylindrical body portion 19 and moving them radially outwardly at an angle through the slots 50 to engage the trunnions 87 in the recesses 86. The plate 76, springs 78 and 80 and stem 75 are then assembled, whereupon the plate 23 is placed in position and attached to the body 18 by the screws 24. Thus the assembly of this portion of the apparatus is very easily and quickly carried out.

The plates 23 and 38 are simple stampings and each performs a plurality of functions. The plate 23 serves, with the flange 21, to clamp the radially inner edge of the diaphragm 22 in position, and it serves as a seat for one end of the spring 78. Moreover, the inner periphery of the plate 23 provides the valve seat 54. The plate 38 acts as a seat for the motor return spring 42 and has its radially inner portion shaped to form the reaction rings or ribs 45. The radially outer portion of the plate 38 is shaped to provide the cylindrical flange 39 over which the adjacent portion of the diaphragm rolls in the operation of the motor.

Thus the structure is capable of highly economical production and is easily assembled, and is highly efficient in operation. Movement of the plate 76 is initially opposed by both of the springs 78 and 80 to delay the transmission of direct reaction to the pedal operated rod 70 until the brake shoes initially engage or are about to engage the brake drums. At the same time, only the spring 80 opposes valve operating movement of the rod 70, and accordingly a soft initial pedal is provided. The spring 80 is not sufficiently strong to substantially resist initial pedal movement, but it is stronger than the spring 83 so that when the pedal is released, the spring 80 returns the pedal operated elements to their normal positions and overcomes the spring 83 to move the valve 52 away from the seat 54. The mechanism is therefor particularly smooth in operation, providing a soft initial pedal, a resiliently transmitted first stage of pedal reaction, followed by a direct application of pedal reaction to the rod 70 through the levers 88.

It is to be understood that the form of the invention shown and described is to be taken as a preferred example of the same and that various changes in the shape, size and arrangement of the parts may be made as do not depart from the spirit of the invention or the scope of the appended claims.

I claim:
1. A booster motor mechanism comprising a casing having a pressure responsive unit therein dividing it to form a constant pressure chamber and a variable pressure chamber, said unit having relatively axially movable portions, a valve mechanism carried by said pressure responsive unit and normally balancing pressures in said chambers and movable to connect said variable pressure chamber to a source of pressure to move said pressure responsive unit, a member to be operated connected to one of said axially movable portions of said pressure responsive unit, a manually operable member connected to said valve mechanism to operate it, a reaction member engageable with said manually operable member and having mechanical connection with said axially movable portions of said pressure responsive unit to transmit reaction forces from said member to be operated to said manually operable member, and a pair of springs, one of which is arranged between said manually operable member and said reaction member, the other spring being arranged between said reaction member and said one axially movable portion of said pressure responsive unit whereby said one spring opposes valve operating movement of said manually operable member and both springs oppose movement of said reaction member into engagement with said manually operable member.

2. A booster motor mechanism comprising a casing having a pressure responsive unit therein dividing it to form a constant pressure chamber and a variable pressure chamber, said unit having relatively axially movable portions, a valve mechanism carried by said pressure responsive unit and normally balancing pressures in said chambers and movable to connect said variable pressure chamber to a source of pressure to move said pressure responsive unit, a member to be operated connected to one of said axially movable portions of said pressure responsive unit, a manually operable member connected to said valve mechanism to operate it, a reaction member engageable with said manually operable member, lever means engaging said reaction member and said axially movable portions of said pressure responsive unit at radially spaced points to transmit reaction forces from said member to be operated to said manually operable member, and a pair of springs opposing movement of said reaction member into engagement with said manually operable member, one of said springs being arranged between said manually operable member and said reaction member, the other spring being arranged between said reaction member and said one axially movable portion of said pressure responsive unit whereby said one spring opposes valve operating movement of said manually operable member and both springs oppose movement of said reaction member into engagement with said manually operable member.

3. A booster motor mechanism comprising a casing having a pressure responsive unit therein dividing it to form a constant pressure chamber and a variable pressure chamber, said unit having an axial body formed of sections fixed to each other, a member to be operated connected to said body, said pressure responsive unit further comprising a radially outer portion including a plate and a diaphragm extending between said plate and said casing, said plate being movable axially relative to said body, a valve mechanism carried by said pressure responsive unit and normally balancing pressures in said chambers and movable to connect said variable pressure chamber to a source of pressure to move said pressure responsive unit, a manually operable member connected to said valve mechanism to operate it, a reaction member engageable with said manually operable member and having mechanical connection with said body and said plate to transmit reaction forces from said member to be operated to said manually operable member, and a pair of springs one of which is arranged between said manually operable member and said reaction member, the other spring being arranged between said reaction member and said body of said pressure responsive unit whereby said one spring opposes valve operating movement of said manually operable member and both springs oppose movement of said reaction member into engagement with said manually operable member.

4. A booster motor mechanism comprising a casing having a pressure responsive unit therein dividing it to form a constant pressure chamber and a variable pressure chamber, said unit having an axial body formed of sections fixed to each other, a member to be operated connected to said body, said pressure responsive unit further comprising a radially outer portion including a plate and a diaphragm extending between said plate and said casing, said plate being movable axially relative to said body, a valve mechanism carried by said pressure responsive unit and normally balancing pressures in said chambers and movable to connect said variable pressure chamber to a source of pressure to move said pressure responsive unit, a manually operable member connected to said valve mechanism to operate it, an annular reaction member in said pressure responsive unit surrounding and slidable axially relative to said manually operable member, a plurality of radial levers engaging said reaction member and said body and said plate at radially spaced points whereby said relative movement of said plate incident to resistance to movement of said member to be operated transmits force to said reaction member to engage it with said manually operable member, and a pair of springs one of which is arranged between said manually operable member and said reaction member, the other spring being arranged between said reaction member and said pressure responsive unit, whereby said one spring opposes valve operating movement of said manually operable member and both springs oppose movement of said reaction member into engagement with said manually operable member.

5. A mechanism according to claim 4 wherein said body of said pressure responsive unit comprises a cast body member having a cylindrical wall provided with radial slots, said levers projecting radially through said slots and having fulcrum connection with said body member.

6. A mechanism according to claim 4 wherein said body of said pressure responsive unit comprises a cast body member having a cylindrical wall provided with radial slots, said levers projecting radially through said slots and having fulcrum connection with said body member, said plate at its radially outer extremity having a cylindrical flange, said diaphragm being connected at its outer periphery to said casing and extending over said cylindrical flange to roll thereon during movement of said pressure responsive unit.

7. A booster motor mechanism comprising a casing having a pressure responsive unit therein dividing it to form a constant pressure chamber and a variable pressure chamber, said unit having an axial body formed of a body member and a plate connected thereto, a member to be operated connected to said body member, said pressure responsive unit further comprising a radially outer portion including a diaphragm having an inner peripheral edge secured between said plate and said body member and an outer periphery secured to said casing, a manually operable member coaxial with said pressure responsive unit, a valve mechanism comprising a first annular valve seat carried by said manually operable member and a second annular coaxial valve seat formed at the inner periphery of said plate, an annular valve engageable with said seats, a first spring biasing said valve toward said seats, and a second spring stronger than said first spring biasing said first valve seat toward said valve to be normally maintained in engagement with said valve and to maintain said valve out of engagement with said second seat, there being a space externally of said second valve seat connected to said constant pressure chamber, the space within said second valve seat communicating with said variable pressure chamber, the space within said first valve seat communicating with a source of lower pressure whereby, when said manually operable member is actuated to move said first valve seat away from said valve, said first spring will engage said valve with said second seat and connect said source of lower pressure to said variable pressure chamber.

8. A mechanism according to claim 7 wherein said radially outer portion of said pressure responsive unit comprises a second plate engaging said diaphragm and movable relative to said body in a direction away from said constant pressure chamber, a reaction plate engaging one end of said second spring and normally spaced from a portion of said manually operable member, a spring arranged between said first-mentioned plate and said reaction plate to cooperate with said second spring to bias said reaction plate out of engagement with said manually operable member, and reaction levers respectively engaging at radially spaced points against said reaction plate, said body member and said second plate to transmit reaction forces to said manually operable member from said member to be operated.

9. A booster motor mechanism comprising a casing having a pressure responsive unit therein dividing it to form a constant pressure chamber and a variable pressure chamber, said unit having relatively axially movable portions, a valve mechanism carried by one of such portions and normally balancing pressures in said chambers and movable to connect one of said chambers to a source of pressure to move said pressure responsive unit, a member to be operated connected to said one axially movable portion of said pressure responsive unit, a manually operable member connected to said valve mechanism to operate it, said pressure responsive unit having a normal off position to which it is movable in one direction axially of said casing, the other axially movable portion when moved in said direction being engageable with said one axially movable portion, a spring arranged between said casing and said other axially movable portion to bias the latter for movement in said direction, a reaction member engageable with said manually operable member and having mechanical connection with both of said axially movable portions to transmit forces to said manually operable member from said other axially movable portion when the latter moves against said spring in the other direction relative to said one axially movable portion, and a pair of springs one of which is arranged between said manually operable member and said reaction member and the other of which is arranged between said reaction member and said one axially movable portion whereby said one spring opposes valve operating movement of said manually operable member and both springs of said pair oppose movement of said reaction member into engagement with said manually operable member.

10. A motor mechanism according to claim 9 wherein said other axially movable portion of said pressure responsive unit comprises a plate against which said first-named spring engages, and a rolling diaphragm connected at its inner periphery to said one axially movable portion of said pressure responsive unit, the outer periphery of said diaphragm being connected to said casing, said plate having a radially outer cylindrical flange over which said diaphragm is adapted to roll.

References Cited in the file of this patent

UNITED STATES PATENTS

| | | |
|---|---|---|
| 2,826,041 | Rike | Mar. 11, 1958 |
| 2,826,042 | Rike et al. | Mar. 11, 1958 |
| 2,828,719 | Ayers | Apr. 1, 1958 |
| 2,842,101 | Price | July 8, 1958 |
| 2,867,193 | Ayers | Jan. 6, 1959 |
| 2,876,627 | Ayers | Mar. 10, 1959 |
| 2,879,645 | Ingres | Mar. 31, 1959 |